United States Patent [19]

Coe

[11] Patent Number: 4,930,727
[45] Date of Patent: Jun. 5, 1990

[54] CROSS BRACED AIRFOIL

[76] Inventor: Bill J. Coe, 2761 W. 78 St., Hialeah, Fla. 33016

[21] Appl. No.: 272,328

[22] Filed: Nov. 17, 1988

[51] Int. Cl.⁵ .............................................. B64D 17/02
[52] U.S. Cl. ..................................... 244/145; 244/142; 244/146
[58] Field of Search ................... 244/153 R, 142, 146, 244/145, 144, 154

[56]     References Cited
        U.S. PATENT DOCUMENTS

| Re. 26,427 | 7/1968 | Jalbert | 244/145 |
| 2,365,184 | 12/1944 | Frieder et al. | 244/145 |
| 2,465,409 | 3/1949 | Weinig | 244/145 |
| 3,199,814 | 8/1965 | Frieder | 244/145 |
| 3,227,403 | 1/1966 | Ferguson | 244/145 |
| 3,228,635 | 1/1966 | Hughes et al. | 244/145 |
| 3,298,635 | 1/1967 | Barish | 244/145 |
| 3,351,573 | 11/1967 | Skreckoski | 260/18 |
| 3,412,963 | 11/1968 | Struble, Jr. | 244/146 |
| 3,428,277 | 2/1969 | Everett, Jr. | 244/142 |
| 3,724,789 | 4/1973 | Snyder | 244/145 |
| 3,749,377 | 7/1973 | Jalbert | 244/145 |
| 3,893,641 | 7/1975 | Sutton | 244/142 |
| 4,015,801 | 4/1977 | Womble et al. | 244/145 |
| 4,634,080 | 1/1987 | McNally | 244/142 |

Primary Examiner—Joseph F. Peters, Jr.
Assistant Examiner—Anne Sartelle
Attorney, Agent, or Firm—Malloy & Malloy

[57]     ABSTRACT

An improved, cross braced airfoil for a wing-type parachute which is composed of an upper panel having a front edge and a rear edge and angularly oriented rib panels secured to the top panel and extending downwardly away from the top panel to a generally fore and aft row of suspension line attachments.

8 Claims, 1 Drawing Sheet

CROSS BRACED AIRFOIL

FIELD OF THE INVENTION

This invention relates to wing-type parachutes.

BACKGROUND OF THE INVENTION

In wing-type parachutes there are suspension lines which extend downwardly from a canopy composed of a top panel and depending cells between the front edge of the top panel and the rear edge. In flight of a billowed canopy, the air flow about the canopy and the suspension lines attached to the parachute in opposition to lift forces constrain the parachute to an airfoil shape generally. Generally, the more suspension lines the more effective the airfoil and, while it is possible to add more suspension lines, this adds undesirable drag to the parachute in use. The present invention provides additional angularly oriented braces, or fore to aft angularly oriented rib panels. The angularly oriented rib panels in the canopy extend generally downwardly from the top panel and may extend from the front edge of the top panel to the rear edge of the top panel. The effectiveness of the cross bracing is greater near the front where the airfoil is generally thicker than it is where the airfoil is generally thinner.

Generally speaking, the invention provides angularly oriented force to aft rib panels in a wing-type parachute to increase the aspect ratio and decrease the span-wise deformation of a parachute. It is caused by inflation and flight loads compared of what may be considered a cross braced airfoil wherein angularly oriented rib panels are provided. In one form of the invention, the angularly oriented rib panels may extend all the way from the front edge of the top panel to the rear edge and in any event, the suspension lines are attached to the parachute in such number as to provide an effective airfoil; however, the cross braced airfoil design set forth herein eliminates the need of numerous suspension lines. Generally, this invention is, therefore, of a parachute which does not require as many suspension lines to maintain an efficient airfoil as would be the case with a canopy which is not provided with the angularly oriented braces or rib panels.

OBJECTS OF THE PRESENT INVENTION

It is an object of the present invention to provide a wing-type parachute which provides for better load distribution of the top panel of the wing-type parachute with less span-wise shrinkage between line attachments and better control of the airfoil shape with less lines which, would otherwise, add drag.

DESCRIPTION OF THE PREFERRED EMBODIMENTS

Figure 1:
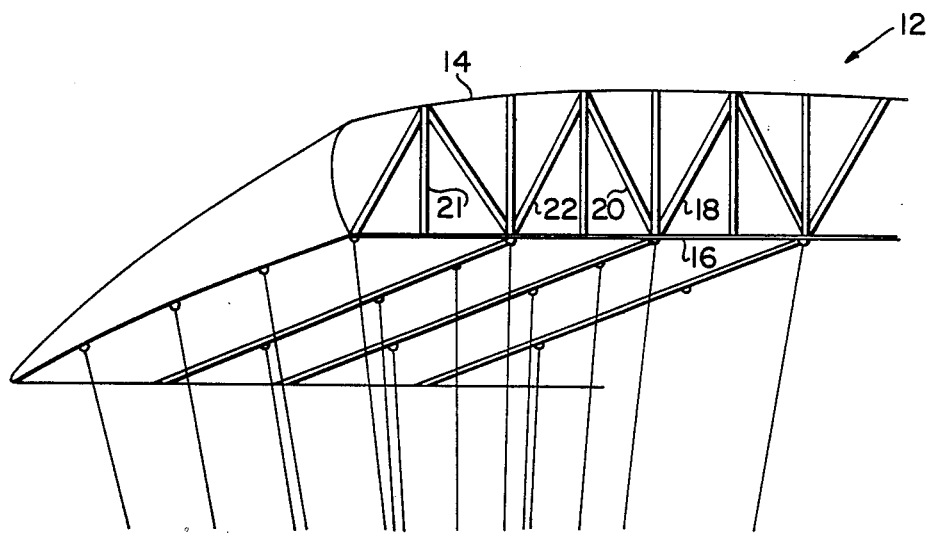
FIG. 1 is a partial perspective view of a wing-type parachute in accordance with this invention.
Figure 2:
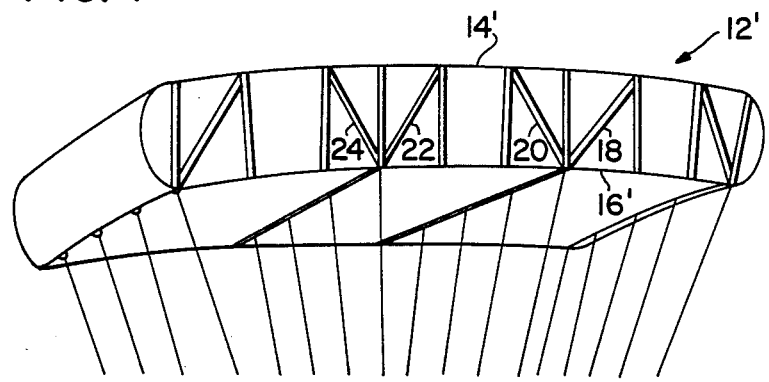
FIG. 2 is a view similar to FIG. 1 of a slightly modified version of the present invention.

Referring to FIG. 1 a wing-type parachute is generally designated as 12. It includes a top panel 14 having a front edge and a rear edge and a plurality of spaced ribs such as 21 extending generally downwardly to a bottom panel 16. The downwardly extending ribs, such as 21, are spaced from one another and, additionally, there are angularly oriented rib panels, such as 20 and 22. In the embodiment shown in FIG. 1, the angularly oriented rib panels extend in an angular relation with respect to vertical from a fore to aft connection with the top panel, which may be through the upper zone of a vertical rib at the general area of vertical rib attachment to the top panel. In the embodiment of FIG. 1 the angularly oriented rib panels, such as 20 and 22 diverge outwardly from one another and downwardly to a zone of connection with the bottom panel 16. The suspension lines extend downwardly from the canopy composed of this described structured. It is thus seen that there are cells extending from the front edge of the top panel and front of the parachute toward the rear. In this embodiment, the cell portions are each generally right triangular in cross-section. As seen in FIG. 2, an alternative wing-type parachute 12' is shown. It is composed of a top panel 14' with a front edge and a rear edge and a plurality of spaced vertically extending rib panels. Each of the vertical rib panels is connected to an adjacent vertical rib panel by means of angularly oriented rib panels such as 18, 20, 22 and 24. The angularly oriented rib panels are connected to the bottom panel at a zone of juncture running from fore to aft along the bottom panel generally in the zone of connection of one of the vertically extending rib panels to the bottom panel.

Figure 3:
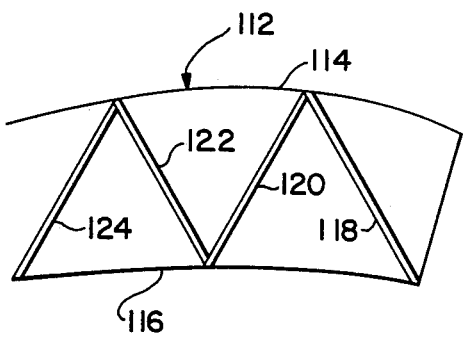
FIG. 3 is a side view in partial cut-away of an angularly oriented rib panel as seen inside the canopy in which load distribution tapes are seen along the rib panel, which may or may not be utilized.

Referring now to FIG. 3, the parachute canopy is generally designated by the numeral 112 and the top panel is generally designated by the numeral 114, while the bottom panel is designated by the numeral 116. From the front at the right of FIG. 3, an angularly oriented rib panel is seen and along this rib panel there may be provided reinforcing tapes such as 118, 120, 122 and 124; however, in some structures such reinforcing tapes may not be utilized.

Figure 4:
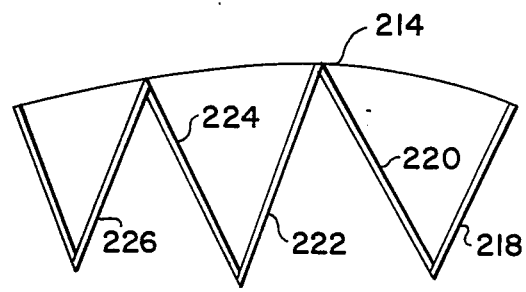
FIG. 4 is a side view in partial cut-away similar to FIG. 3 of an angularly oriented rib panel as seen from the inside of the canopy and showing a somewhat modified structure in that a portion of the angularly oriented rib panel is cutaway.

In FIG. 4, the top panel is generally designated by the numeral 214 and from the front, at the right of FIG. 4, it is seen that the rib panel maybe cut away defining a plurality of cutout areas having triangular shapes extending along the length of each angularly oriented rib panel. Reinforcing tapes 220 and 222 and 224 and 226 may be provided along the peripheral boundaries of the cutout areas.

While the instant invention has been shown and described in what is considered to be two practical and preferred embodiments, it is recognized that departures may be made within the spirit and scope of this invention which is, therefore, not to be limited except as set forth in the claims hereinafter and within the doctrine of equivalents.

What is claimed is:

1. A wing type parachute including a top panel having a front edge and a rear edge, a plurality of spaced generally vertical rib panels extending in a common direction away from the top panel and said spaced vertical rib panels extending from the front edge of the top panel toward the rear edge of the top panel defining cells below the top panel, a plurality of spaced suspension lines extending from the parachute, means to attach the suspension lines to the parachute extending along a plurality of rows oriented in a substantially fore to aft direction along the parachute, and plurality of angularly oriented rib panels, each having an upper edge and a lower edge and the upper edge being connected to the parachute in the zone of attachment of a vertical rib panel to the top panel and with the lower edge of the angularly oriented rib panels being connected to the parachute adjacent one of the fore aft rows, the angularly oriented rib panels converging toward one another at the top panel.

2. The parachute as set forth in claim 1 wherein one of said generally vertical rib panels bisects each of the angularly oriented rib panels of each juncture of said angularly oriented rib panels adjacent the top panel.

3. The parachute as set forth in claim 1 which includes a bottom panel, the force to aft rows formed on the bottom panel and the angularly oriented rib panels connected to the bottom panel in the general area of the fore to aft rows.

4. The parachute as set forth in claim 3 wherein said angularly oriented rib panels converge toward one another and are connected to the parachute adjacent the general area of one of said vertical rib panels along the bottom panel.

5. The parachute as in claim 3 wherein said plurality of angularly oriented rib panels include reinforcement tape thereon extending angularly between the top and bottom panels.

6. The parachute as in claim 1 wherein the plurality of angularly oriented rib panels include a plurality of cutout areas extending along the length thereof.

7. The parachute as in claim 6 wherein the cutout areas are substantially triangular in shape.

8. The parachute as in claim 7 wherein peripheral boundaries of the cutout areas are defined by reinforcement tape formed on the angularly oriented rib panels.

* * * * *